(12) United States Patent
Jones, Jr.

(10) Patent No.: US 10,745,070 B2
(45) Date of Patent: Aug. 18, 2020

(54) TRACK PAD GEOMETRY FOR SOFT SURFACES

(71) Applicant: Caterpillar Inc., Peoria, IL (US)

(72) Inventor: Benjamin Isaac Jones, Jr., Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 248 days.

(21) Appl. No.: 15/920,752

(22) Filed: Mar. 14, 2018

(65) Prior Publication Data

US 2019/0283818 A1    Sep. 19, 2019

(51) Int. Cl.
*B62D 55/20* (2006.01)
*B62D 55/21* (2006.01)

(52) U.S. Cl.
CPC .......... *B62D 55/202* (2013.01); *B62D 55/21* (2013.01)

(58) Field of Classification Search
CPC ....... B62D 55/21; B62D 55/202; B62D 55/26
See application file for complete search history.

(56) References Cited

U.S. PATENT DOCUMENTS

| | | | |
|---|---|---|---|
| 1,474,967 A | 11/1923 | Koehring | |
| 1,786,924 A | 12/1930 | Turnbill | |
| 2,452,921 A * | 11/1948 | Gillespie | B62D 55/125 305/53 |
| 3,475,060 A | 10/1969 | Kaifesh | |
| 4,176,887 A * | 12/1979 | Alpers | B62D 55/08 305/106 |
| 4,278,140 A | 7/1981 | Oswald et al. | |
| 4,455,053 A | 6/1984 | Rasmussen | |
| 6,543,863 B1 | 4/2003 | Hannan et al. | |
| 6,964,317 B2 | 11/2005 | Groves et al. | |
| 7,530,650 B2 * | 5/2009 | Hannan | B62D 55/202 305/201 |
| 9,434,428 B2 * | 9/2016 | Hakes | B62D 55/20 |
| 9,446,802 B2 | 9/2016 | Weibß et al. | |
| 9,902,444 B2 * | 2/2018 | Neyer | B62D 55/20 |
| 2004/0178676 A1 * | 9/2004 | Hannan | B62D 55/20 305/157 |
| 2005/0151421 A1 | 7/2005 | Colwell et al. | |
| 2015/0158536 A1 | 6/2015 | Takagi et al. | |
| 2015/0197294 A1 | 7/2015 | Hakes | |
| 2016/0023697 A1 * | 1/2016 | Neyer | B62D 55/12 305/202 |
| 2016/0176456 A1 * | 6/2016 | Oertley | B62D 55/213 305/186 |
| 2017/0240230 A1 * | 8/2017 | Colwell | B62D 55/20 |

FOREIGN PATENT DOCUMENTS

DE    202015002177    4/2015

\* cited by examiner

*Primary Examiner* — Kip T Kotter
(74) *Attorney, Agent, or Firm* — Law Office of Kurt J. Fugman LLC

(57) ABSTRACT

A track chain member comprises a shoe member defining a track chain traveling direction and a lateral direction perpendicular to the track chain traveling direction, the shoe member further defining a first lateral end, a second lateral end, and a ground engaging surface spanning from the first lateral end to the second lateral end; wherein the shoe member further defines a main central void disposed on the ground engaging surface that is centered along the lateral direction of the shoe member with respect to the first and the second lateral ends.

20 Claims, 4 Drawing Sheets

TRACK PAD GEOMETRY FOR SOFT SURFACES

TECHNICAL FIELD

The present disclosure relates to track pads used in track chains for heavy equipment using endless track drives. Specifically, the present disclosure relates to track pad geometry suitable for use on soft surfaces.

BACKGROUND

In many current applications, track chain members such as track links or track shoes, or track pads, are attached to each other using a pin that allows the track chain members to rotate relative to each other while still allowing the chain to remain in tension when installed on the undercarriage of a track type vehicle. For heavy equipment, such as electric rope shovels and the like, track pads which incorporates the track rail and track shoe in a single, unitary body are used. In some applications the track pads are required to support the heavy load of the machine on soft surfaces such as oil sand and the like.

Due to the lack of support on soft surfaces and/or packing of the soft material such as oil sand into the cavities of the track pad, the track pad may develop cracks, or experience pitch extension (elongation of the track pad), necessitating repair.

Various track pad geometries are known in the art including the track pad geometry disclosed in U.S. Pat. No. 9,446,802 to Oliver Weiβ et al. The '802 patent discloses a track pad for a chain of a chain wheel drive, the track pad having a bearing surface provided with at least one grouser (1, 2), extending in the lateral direction of the bearing surface, wherein at least one flat part (4, 5) is provided next to at least one grouser part (1, 2) in the lateral direction of the bearing surface. Further, the invention comprises a track pad for a chain of a chain wheel drive, the track pad having a bearing surface provided with at least one grouser (32, 33) protruding from a base plate (40), the grouser (32, 33) extending in the lateral direction of the bearing surface, wherein the bearing surface of the base plate has a profile in the lateral direction. As can be seen, the '802 patent is directed to reducing the shearing forces within the track chain when the machine moves around a corner caused by the grip provided by the grousers.

Accordingly, there is a need to develop a track pad when used on soft surfaces that is more robust than has heretofore been devised.

SUMMARY

A track chain member according to an embodiment of the present disclosure is provided comprising a shoe member defining a track chain traveling direction and a lateral direction perpendicular to the track chain traveling direction, the shoe member further defining a first lateral end, a second lateral end, and a ground engaging surface spanning from the first lateral end to the second lateral end; a first lug extending from the shoe member in a first direction parallel to the track chain traveling direction; a second lug extending from the shoe member in a second direction parallel to the track chain traveling direction and opposite to the first direction; the track chain member further defining a top surface spanning from the first lug to the second lug; a first rib coupling the shoe member to the first lug; and a second rib coupling the shoe member to the second lug, defining a first side recess between the first rib and the second rib, the first side recess also extending from the exterior of the shoe member and underneath the top surface, the first lateral end defining a first lateral end width along the track chain traveling direction, the first side recess also spanning the majority of the first lateral end width along the track chain traveling direction.

A track chain member according to another embodiment of the present disclosure is provided comprising a shoe member defining a track chain traveling direction and a lateral direction perpendicular to the track chain traveling direction, the shoe member further defining a first lateral end, a second lateral end, and a ground engaging surface spanning from the first lateral end to the second lateral end; wherein the shoe member further defines a main central void disposed on the ground engaging surface that is centered along the lateral direction of the shoe member with respect to the first and the second lateral ends being spaced away from the first and the second lateral ends.

A track chain assembly according to an embodiment of the present disclosure comprises a plurality of interlocking track chain members wherein each track chain member defines a track chain traveling direction, a lateral direction perpendicular to the track chain traveling direction, and includes a shoe member defining a first lateral end, a second lateral end, and a ground engaging surface spanning from the first lateral end to the second lateral end; a first rail member extending from the shoe member disposed proximate the first lateral end, and a second rail member extending from the shoe member disposed proximate the second lateral end spaced away from the first rail member; a first rib and a second rib extending between the first rail member and the first lateral end of the shoe member, defining a first side recess therebetween; a third rib and a fourth rib extending between the second rail member and the second lateral end of the shoe member, defining a second side recess therebetween; wherein each track chain member further defines a main central void defined by the ground engaging surface of the shoe member.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
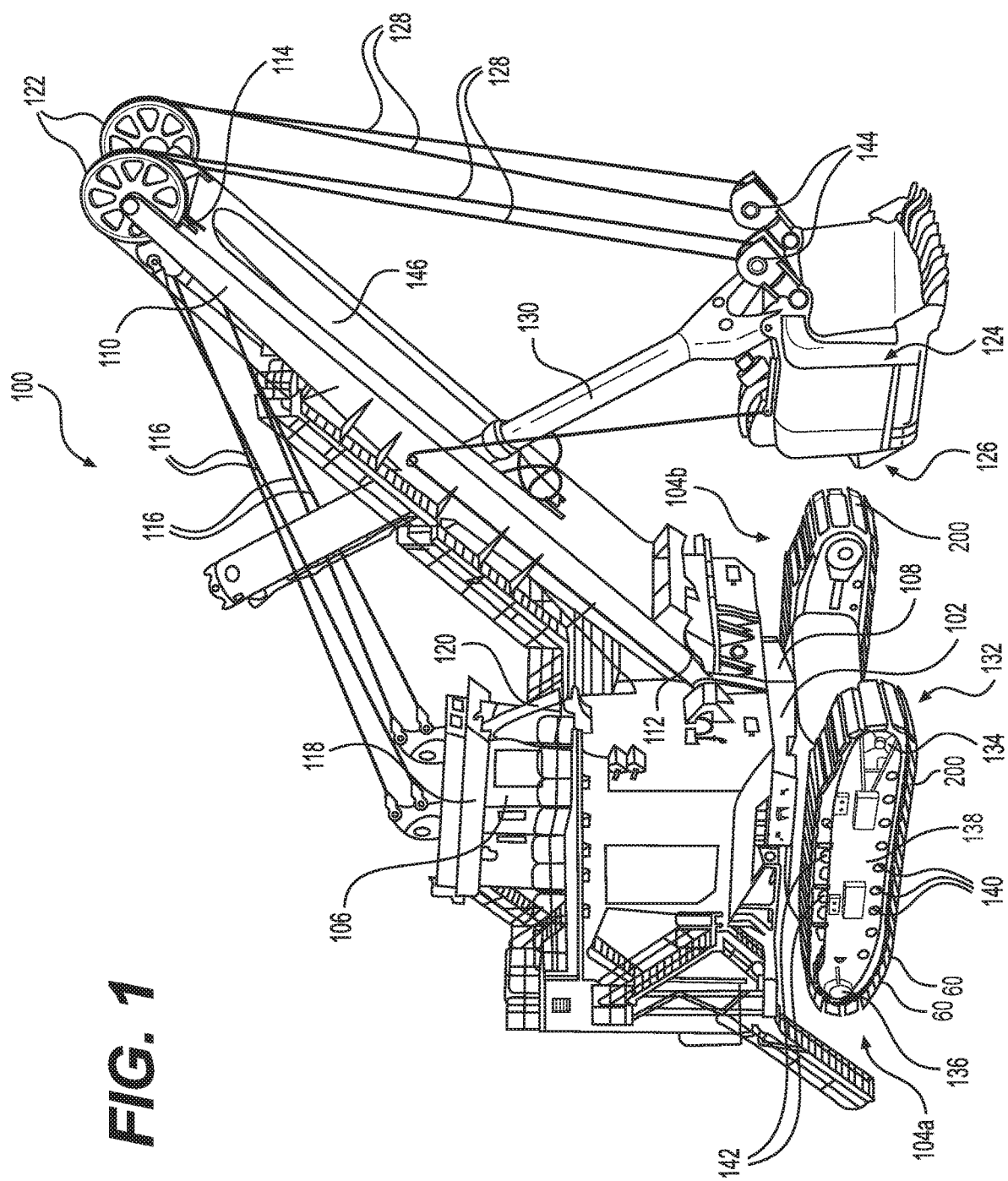
FIG. 1 is a perspective view of a machine such as an electric rope shovel that has track chains that use an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include a track chain member, such as a track pad, and a track chain that may use a plurality of track chain members according to various embodiments of the present disclosure, etc. First, a machine that may use such track chain members or such track chains will be discussed.

Referring to FIG. 1, there is shown a machine 100 having a frame 102 (may include a turntable 108) with a track system 104, including a first track chain 104a and a second track chain 104b positioned at opposite sides of frame 102. Machine 100 is shown in the context of an electric rope shovel having an operator cab 106, a boom 110, a lower end 112 of the boom 110 (also called a boom foot), an upper end 114 of the boom 110 (also called a boom point), tension cables 116, a gantry tension member 118, a gantry compression member 120, a sheave 122 rotatably mounted on the upper end 114 of the boom 110, a dipper bucket 124, a dipper door 126 pivotally coupled to the dipper bucket 124, a hoist rope 128, a winch drum (not shown), and a dipper handle 130. An electric motor controls the winch drum, causing the lower or raising of the boom, dipper bucket, and upward and downward movement of the dipper handle relative to the boom.

Tracks 104a and 104b are part of a machine undercarriage 132 coupled with frame 102 in a conventional manner. Each of tracks 104a and 104b include a plurality of coupled together track shoes 60 forming endless loops extending about a plurality of rotatable elements. In a typical design, an idler 134 and a drive sprocket 136 will be associated with each of tracks 104a and 104b and mounted to a track roller frame 138. A plurality of track rollers 140 may also be mounted to roller frame 138, and are associated with each of tracks 104a and 104b to support machine 100 and guide tracks 104a and 104b in desired paths, as further described herein. One or more carrier rollers 142 may also be associated with each of tracks 104a and 104b to support and guide the tracks opposite rollers 140 during operation.

The unique design of tracks 104a and 104b and the overall track and undercarriage system of which they are a part are contemplated to enable machine 100 to operate in certain environments such as soft underfoot conditions without the shortcomings associated with many earlier designs. While use in the machine environment of an excavator is emphasized herein, it should be understood that machine 100 might comprise a different type of machine. For instance, track-type tractors or even half-track machines are contemplated herein. Further still, machine 100 might consist of a conveyor or other type of machine wherein tracks are used for purposes other than as ground engaging elements. Also, the machine might be some type of hydraulic shovel, bull dozer, excavator, back hoe, etc.

The dipper bucket 124 is suspended from the boom 110 by the hoist rope 128. The hoist rope 128 is wrapped over the sheave 122 and attached to the dipper bucket 124 at a bail 144. The hoist rope 128 is anchored to the winch drum (not shown). The winch drum is driven by at least one electric motor (not shown) that incorporates a transmission unit (not shown). As the winch drum rotates, the hoist rope 128 is paid out to lower the dipper bucket 124 or pulled in to raise the dipper bucket 124. The dipper handle 130 is also coupled to the dipper bucket 124. The dipper handle 130 is slidably supported in the saddle block 146, and the saddle block 146 is pivotally mounted to the boom 110 at the shipper shaft (not clearly shown). The dipper handle 130 includes a rack and tooth formation thereon that engages a drive pinion (not shown) mounted in the saddle block 146. The drive pinion is driven by an electric motor and transmission unit (not shown) to extend or retract the dipper handle 130 relative to the saddle block 146.

An electrical power source (not shown) is mounted to the frame 102 to provide power to a hoist electric motor (not shown) for driving the hoist drum, one or more crowd electric motors (not shown) for driving the crowd transmission unit, and one or more swing electric motors (not shown) for turning the turntable 108. In some cases, electric motor powers all of the moving components of the shovel. Each of the crowd, hoist, and swing motors is driven by its own motor controller, or is alternatively driven in response to control signals from a controller (not clearly shown).

The track chains 104a and 104b are considered to be well suited for work in soft underfoot conditions. To this end, the track chains 104a and 104b may be "low ground pressure" tracks, each having track members with a relatively large ground contact area for distributing pressure from the weight of machine 100 across a relatively large surface area. Each of track shoe members has a footprint defined in part by front and back edges, and also defined in part by outboard edges and. Each of track shoe members may further include a ground contact area that is equal to its footprint, or less than its footprint only to an extent that adjacent track shoes overlap one another or due to voids disposed on the bottom surface of the track shoe member.

Figure 2:
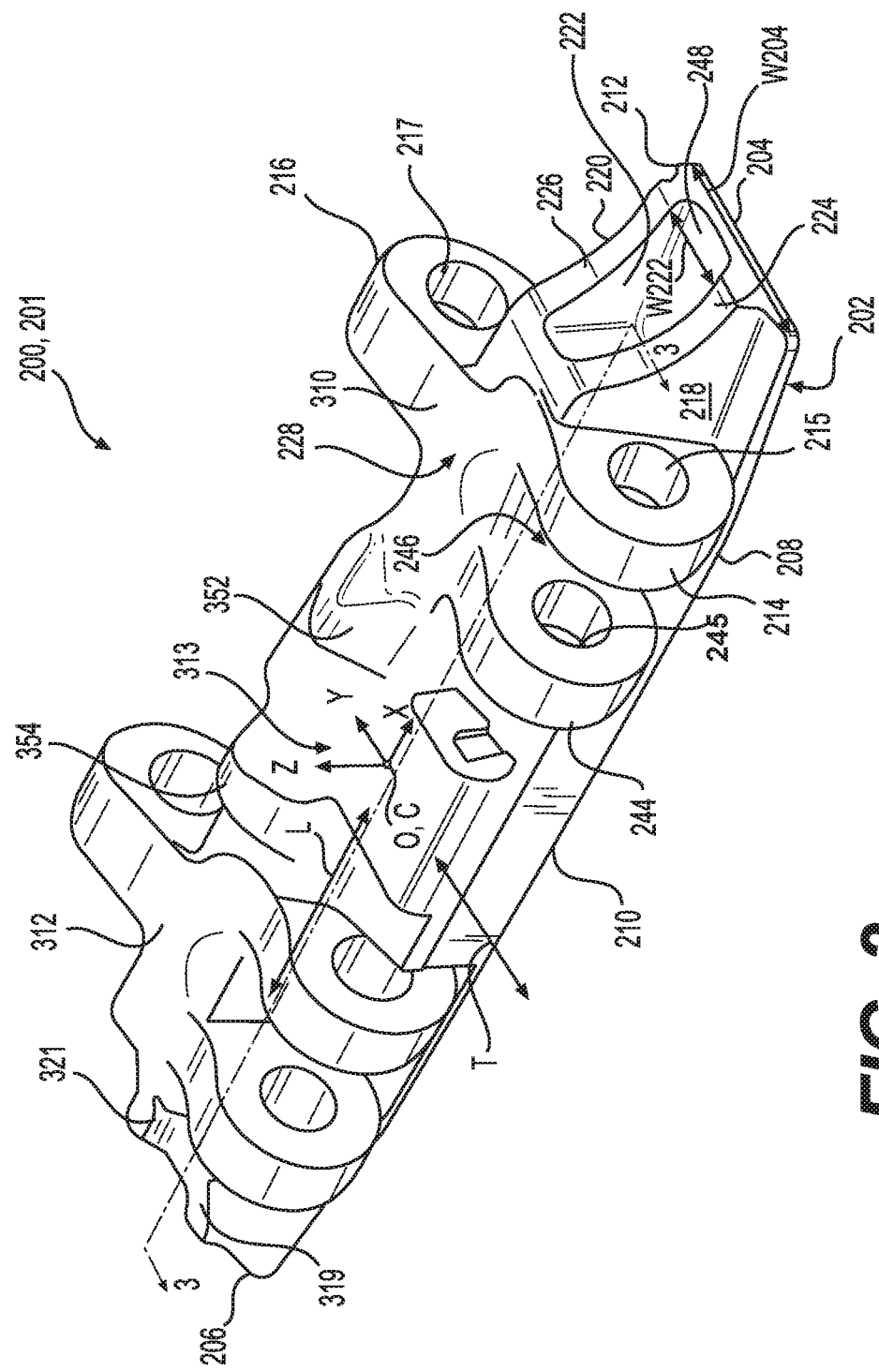
FIG. 2 is a perspective view of track chain member such as a track pad according to an embodiment of the present disclosure that may be used with the machine of FIG. 1.
Figure 3:
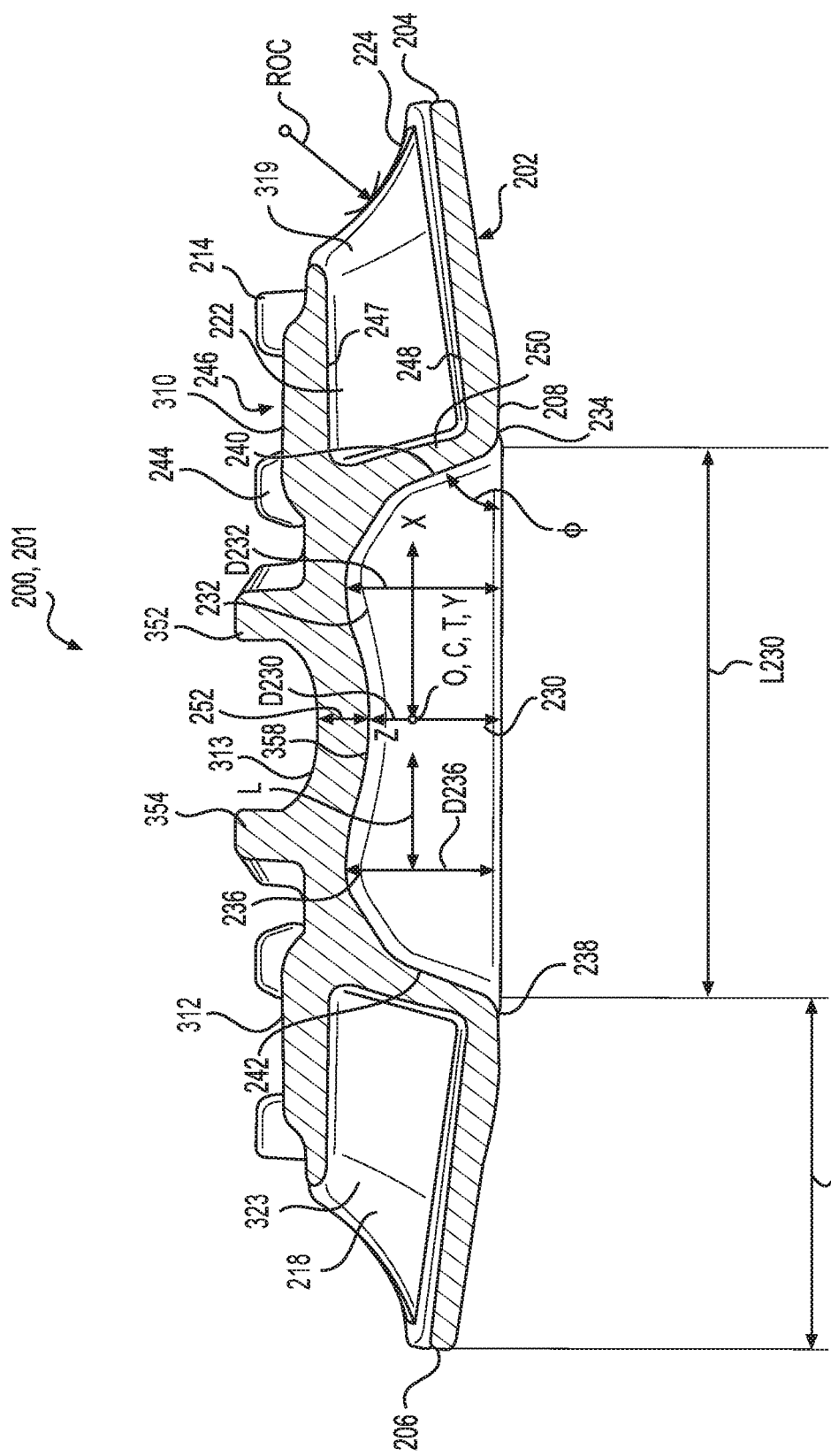
FIG. 3 is a cross-sectional view of the track pad of FIG. 2 taken along lines 3-3 thereof.
Figure 4:
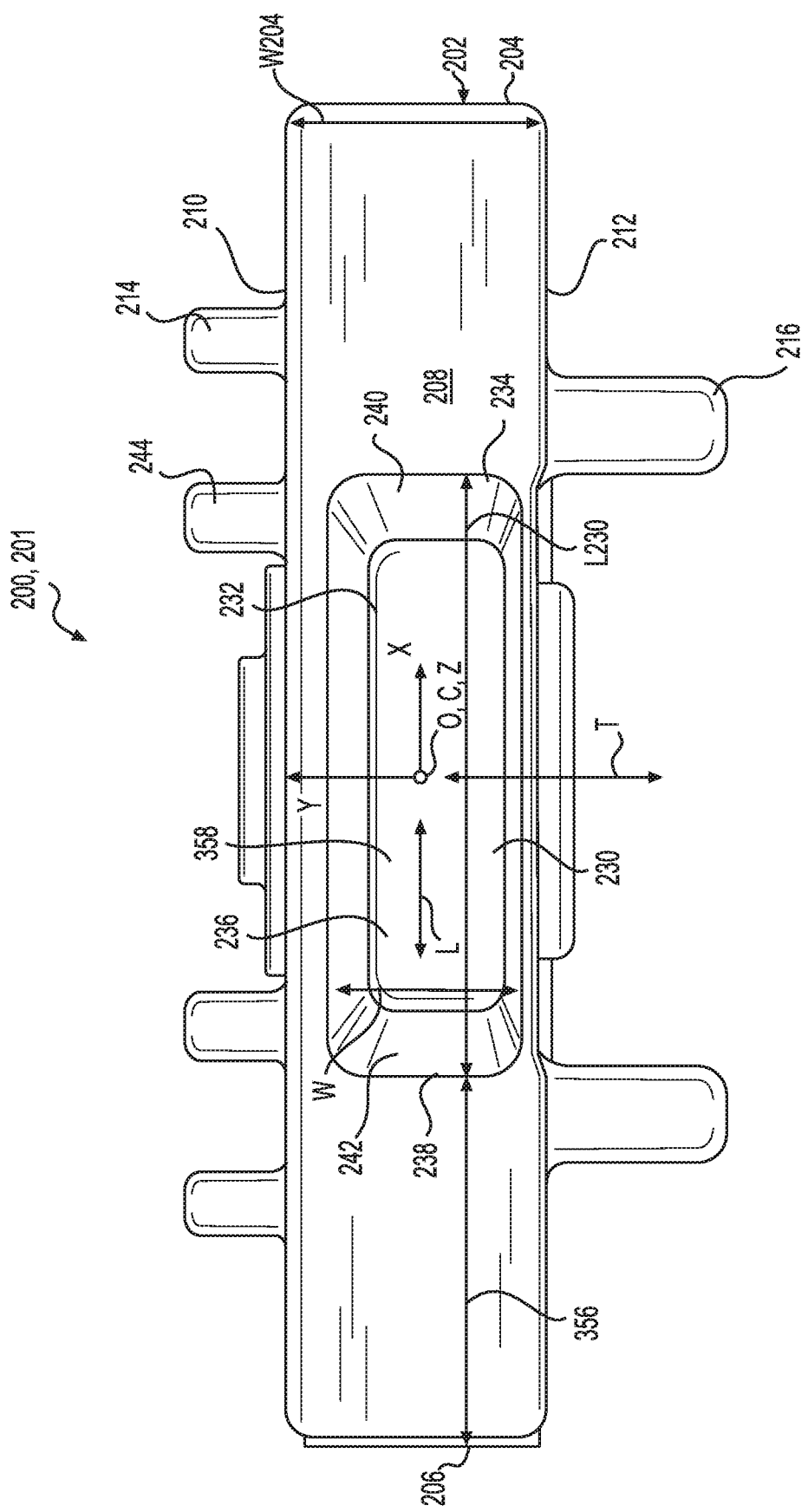
FIG. 4 is a bottom view of the track pad of FIG. 2.

For providing a point a reference, FIGS. 2 thru 4 show a Cartesian coordinate system with an origin O placed at the center of mass C (may also be referred to as a centroid), with the X-axis parallel to the bores 215, 217, 245 of the lugs 214, 216, 244 and lateral direction L, the Y-axis parallel to the direction to the track chain travelling direction T, and the Z-axis parallel to the vertical direction when used on a machine 100.

Focusing now on FIGS. 2 thru 4, various features of the track chain member that may help a track chain member withstand the loads exerted on it without deformation or cracking will be discussed. As shown, the track chain member 200 (e.g. unitary track pad 201) may comprise a shoe member 202 defining a track chain traveling direction T and a lateral direction L perpendicular to the track chain traveling direction T. The shoe member 202 may further define a first lateral end 204 (may also be referred to as an outboard edge), a second lateral end 206, and a ground engaging surface 208 spanning from the first lateral end 204 to the second lateral end 206 along the lateral direction L and from the front edge 210 to the rear edge 212 along the track chain traveling direction T. The shoe member 202 may further comprise a first lug 214 extending from the shoe member 202 in a first direction (negative Y direction) parallel to the track chain traveling direction T, a second lug 216 extending from the shoe member 202 in a second direction (positive Y direction) parallel to the track chain traveling direction T and opposite to the first direction (negative Y direction), a first rib 218 coupling the shoe member to the first lug 214, and a second rib 220 coupling the shoe member 202 to the second lug 216, defining a first side recess 222 between the first rib 218 and the second rib 220. The first side recess 222 may extend underneath the top surface 228 joining the first and the second lugs 214, 216 together. That is to say, the top surface 228 may be at least partially parallel with the top boundary 247 of the first side recess 222. The first side recess 222 may be bound on the bottom by the shoe member 202. That is to say, the shoe member 202 may define a bottom boundary 248 of the first side recess 222. The first side recess 222 may define a first side recess width W222 that spans the majority of the first lateral end width 204 along the track chain traveling direction T. For example, the ratio of the value of W222 may be at least 75% of the first lateral end width W204.

For the embodiment shown in FIGS. 2 thru 4, the first rib 218 and the second rib 220 have a first concave top surface 224 and a second concave top surface 226 respectively that span the majority of the distance along the height of the track chain member 200 (measured along the Z direction) from the shoe member 202 to the top surface 228 of the first and the second lugs 214, 216. This may not the case in other embodiments. As best seen in FIG. 3, the first top concave surface 224 or the second top concave surface 226 may define a radius of curvature ROC, ranging from 295 mm to 305 mm.

In addition, as best seen in FIGS. 3 and 4, the shoe member 202 may further define a main central void 230 that is disposed on the ground engaging surface 208 and that is centered along the lateral direction L of shoe member 202 with respect to the first and the second lateral ends 204, 206. The track chain member 200 may have a shoe member 202 that further defines a first auxiliary void 232 in communication with the main central void 230. The main central void 230 may define a first side end 234 and the first auxiliary void 232 is positioned proximate the first side end 234 of the main central void 230. The shoe member 202 may further define a second auxiliary void 236 in communication with the main central void 230 and the second auxiliary void 236 that is positioned proximate the second side end 238 of the main central void 230.

Again, the main central void may be defined by the ground engaging surface so that the void is not encapsulated in the shoe member or otherwise obstructed by ribs and the like. As pointed out in FIG. 4, the first and the second side surfaces 240, 242 of the main central void 230 may form an oblique angle φ (e.g. 80 degrees to 87 degrees) with respect to the lateral direction L or the track chain traveling direction T.

As best seen in FIG. 3, the main central void 230 may define a main central void depth D230 in a direction (Z direction) perpendicular to the ground engaging surface 208, the first auxiliary void 232 may define a first auxiliary void depth D232 in a direction (Z direction) perpendicular to the ground engaging surface 208, and the second auxiliary void 236 defines a second auxiliary void depth D236 in a direction (Z direction) perpendicular to the ground engaging surface 208, and the first and the second auxiliary void depths D232, D236 are greater than the main central void depth D230. The ratio of D232 or D236 to D230 may range from 1.0 to 1.5 in some embodiments. A minimum wall thickness 252 may be maintained over the central void where the greatest load is exerted on the track chain member 200 in use. This minimum wall thickness may be at least 96 mm in certain embodiments.

Likewise, exemplary values of D230 may be 100 mm to 158 mm in various embodiments. The width W of the voids along the track traveling direction T may range from 238 mm to 258 mm and the length L230 of the main central void 230 along the lateral direction may range from 800 mm to 1600 mm in other embodiments. In some embodiments, these depths, wall thickness, lengths, and widths may varied as needed or desired to any value not disclosed herein. The lateral ends of the shoe member 204, 206 may be turned up such that the ground engaging surface 208 does not remain planar as one progresses along the lateral direction L of the shoe member 202. This may not be the case in other embodiments.

In some embodiments, the first side recess 222 may extend all the way to the main central void 230 or the first auxiliary void 232, being in communication with these voids. Or, as shown in FIG. 3, the first side recess 222 may be separated from the main central void 230 or first auxiliary void 232 by a web 250 (may also be referred to as a wall). The first side recess 222 may be configured so that the wall thickness (minimum dimension) of the web 250, the member forming the top surface 228 and the top boundary 247, and the shoe member 202 forming the ground engaging surface 208 remains relatively consistent.

Referring again to FIGS. 2 and 4, it should be noted that a third lug 244 may also be provided spaced laterally away from the first lug 214, forming a female yoke 246. The female yoke 246 may be laterally positioned between the first and the third lugs 214, 244, allowing similarly or identically configured track chain members 200 to be connected to each other via a pin (not shown) or a bushing (not shown). The track chain member 200 may be symmetrical about the Y-Z axis in some embodiments. The track chain member 200 may be integrally formed, creating a track pad 201 or may be assembled using multiple components, etc. Any of the dimensions or angles discussed herein may be varied as needed or desired in other embodiments to be different than any particular values mentioned herein.

As discussed earlier herein, a track chain assembly 104 (see FIG. 1) may be assembled by interlocking a plurality of track chain members 200 that are similarly or identically configured such as using a series of track chain members 200 as shown in FIGS. 2 thru 4. Other configured track chain members such as master links and the like may also be attached to the plurality of identically or similarly configured track chain members.

Looking now at FIGS. 1 thru 4, the track chain assembly 104a, 104b may comprise a plurality of interlocking track chain members 200, such as a track pad 201, wherein each track chain member defines a track chain traveling direction T, a lateral direction L perpendicular to the track chain traveling direction T, and includes a shoe member 202 defining a first lateral end 204, a second lateral end 206, and a ground engaging surface 208 spanning from the first lateral end 204 to the second lateral end 206. As depicted, a first rail member 310 may extend from the shoe member 202 disposed proximate the first lateral end 204, and a second rail member 312 extending from the shoe member 202 disposed proximate the second lateral end 206 spaced away from the first rail member 310, defining a central support region 313 therebetween. A first projection 352 and a second projection 354 are provided in the central support region 313, equally spaced longitudinally about the Y-Z plane, providing guidance for the rollers 140, 142, idler 134 and sprocket 136 of the machine 100, which pass between these projections 352, 354.

Referring to FIGS. 2 and 3, the track chain member 200 may include a first rib 318 and a second rib 320 extending between the first rail member 310 and the first lateral end 304 of the shoe member 202. The first rib 318 and the second rib 320 may define a first side recess 222 therebetween. Similarly, there may be a third rib 319 and a fourth rib 321 extending between the second rail member 312 and the second lateral end 206 of the shoe member 202. The third rib 319 and the fourth rib 321 may define a second side recess 323 therebetween. The first and the second side recesses 222, 323 may be configured as previously described with regarding the first side recess 222.

Looking at FIGS. 3 and 4, the main central void 230 defined by the ground engaging surface 208 of the shoe member 202 may be disposed beneath the central support region 313 along a direction perpendicular to the ground engaging surface 208 (Z direction). The main central void 330 may define a lateral length L230, ranging from 800 mm to 1600 mm. Also, the main central void 230 may define a width W measured along the track chain traveling direction T, ranging from 238 mm to 258 mm. The main central void 230 may be evenly spaced from the first lateral end 204 and the second lateral end 206. The distance 356 from either the first lateral end 204 or the second lateral end 206 to the main central void 230 may range from 500 mm to 1000 mm. The main central void 230 may be differently configured and/or positioned in other embodiments.

The shoe member 202 may further define a first auxiliary void 232 in communication with the main central void 230 and the main central void 230 may define a first side end 234 and the first auxiliary void 232 is positioned proximate the first side end 234 of the main central void 230. Similarly, a second auxiliary void 236 may be provided that is in communication with the main central void 230 and the second auxiliary void 236 may be positioned proximate the second side end 238 of the main central void 230.

The main central void 230 may defines a main central void depth D230 in a direction perpendicular to the ground engaging surface 208 (Z direction), the first auxiliary void 232 defines a first auxiliary void depth D232 in a direction perpendicular to the ground engaging surface 208 (Z direction), and the second auxiliary void 236 defines a second auxiliary void depth D236 in a direction perpendicular to the ground engaging surface 208 (Z direction), and the first and the second auxiliary void depths D232, D236 are greater than the main central void depth D230. The bottom surfaces defining the voids 230, 232, 236, such as the depth D232 of the first auxiliary void 232, the depth D236 of the second auxiliary void 236, and the depth D230 of main central void 230 includes an undulating surface 358. This feature may be omitted in other embodiments.

The first projection 352 may be disposed at least partially above the first auxiliary void 232 and the second projection 354 may be disposed at least partially above the second auxiliary void 236, defining a place for rollers 140, 142, an idler 134, or a sprocket 136 of the machine 100 to rest.

Again, it should be noted that any of the dimensions, angles, or ratios discussed herein may be varied as needed or desired to be different than what is shown in FIGS. 2 thru 4 in other embodiments. Similarly, various features may be differently configured or omitted in various embodiments.

INDUSTRIAL APPLICABILITY

In practice, a track chain assembly, track chain member and/or machine may be sold, manufactured, bought etc. and in the aftermarket or original equipment scenarios according to any of the embodiments discussed herein. That is to say, the machine may be sold with the track chain assembly, and/or track chain member according to embodiments described herein or the machine may be retrofitted, repaired, refurbished to use any of the embodiments discussed herein. The various components including, but not limited to the track chain members, may be manufactured from any suitable material such as cast iron, grey cast iron, steel, etc. The track chain member may be initially cast or forged and then additional features may be machined on the track chain member. For example, the bores of the lugs may be machined.

In one particular application, it has been determined that a particular material having a higher carbon content may be used that is more prone to cracks. Configuring the voids so that crack repair is more easily performed may be useful in certain embodiments. Put another way, since there is a lack of obstructions in the main central void, any auxiliary void or any side recess such as ribs or the like and since they are large enough, repair via welding or the like may be more easily performed.

While the arrangement is illustrated in connection with an electric rope shovel, the arrangement disclosed herein has universal applicability in various other types of machines commonly employ track systems, as opposed to wheels. The term "machine" may refer to any machine that performs some type of operation associated with an industry such as mining or construction, or any other industry known in the art. For example, the machine may be an excavator, wheel loader, cable shovel, or dragline or the like. Moreover, one or more implements may be connected to the machine. Such implements may be utilized for a variety of tasks, including, for example, lifting and loading.

For any of the embodiments discussed herein, the track chain assembly may comprise a plurality of track chain members that are similarly or identically configured. It is to be understood that at least two additional track chain members may be also provided that have different or dissimilar geometry as may be the case for two master links that are joined to the plurality of similar or identically configured track chain members, etc.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track chain member comprising:
   a shoe member defining a track chain traveling direction, a lateral direction perpendicular to the track chain traveling direction, and a vertical direction that is perpendicular to both the track chain traveling direction and the lateral direction, the shoe member further defining a first lateral end, a second lateral end, and a ground engaging surface spanning from the first lateral end to the second lateral end;
   a first lug extending from the shoe member in a first direction parallel to the track chain traveling direction;

a second lug extending from the shoe member in a second direction parallel to the track chain traveling direction and opposite to the first direction;

the track chain member further defining a top surface spanning from the first lug to the second lug;

a first rib coupling the shoe member to the first lug; and a second rib coupling the shoe member to the second lug, defining a first side recess between the first rib and the second rib, the first side recess also extending from the exterior of the shoe member and underneath the top surface, the first lateral end defining a first lateral end width along the track chain traveling direction, the first side recess also spanning the majority of the first lateral end width along the track chain traveling direction;

wherein the first side recess is bound vertically by a top boundary and a bottom boundary.

2. The track chain member of claim 1 wherein the shoe member further defines a main central void disposed on the ground engaging surface that is centered along the lateral direction of shoe member with respect to the first and the second lateral ends and the first rib includes a first concave top surface and the second rib includes a second concave top surface, and the main central void is separated from the first side recess by a web.

3. The track chain member of claim 2 wherein the shoe member further defines a first auxiliary void in communication with the main central void and the main central void defines a first side end, and a second side end, and the first auxiliary void is positioned proximate the first side end of the main central void, and the shoe member defines a bottom boundary of the first side recess.

4. The track chain member of claim 3 wherein the shoe member further defines a second auxiliary void in communication with the main central void and the second auxiliary void is positioned proximate the second side end of the main central void.

5. The track chain member of claim 4 wherein the main central void defines a main central void depth in a direction perpendicular to the ground engaging surface, the first auxiliary void defines a first auxiliary void depth in a direction perpendicular to the ground engaging surface, and the second auxiliary void defines a second auxiliary void depth in a direction perpendicular to the ground engaging surface, and the first and the second auxiliary void depths are greater than the main central void depth.

6. A track chain member comprising:

a shoe member defining a track chain traveling direction, a lateral direction perpendicular to the track chain traveling direction, and a vertical direction that is perpendicular to both the track chain traveling direction and the lateral direction, the shoe member further defining a first lateral end, a second lateral end, and a ground engaging surface spanning from the first lateral end to the second lateral end; and a first side recess that is straddled vertically by a top surface and the ground engaging surface;

wherein the shoe member further defines a main central void disposed on the ground engaging surface that is centered along the lateral direction of the shoe member with respect to the first and the second lateral ends being spaced away from the first and the second lateral ends.

7. The track chain member of claim 6 wherein the shoe member further comprises a first lug extending from the shoe member in a first direction parallel to the track chain traveling direction;

a second lug extending from the shoe member in a second direction parallel to the track chain traveling direction and opposite to the first direction;

a first rib coupling the shoe member to the first lug; and a second rib coupling the shoe member to the second lug, defining a first side recess between the first rib and the second rib.

8. The track chain member of claim 6 wherein the shoe member further defines a first auxiliary void in communication with the main central void and the main central void defines a first side end and a second side end, and the first auxiliary void is positioned proximate the first side end of the main central void.

9. The track chain member of claim 8 wherein the shoe member further defines a second auxiliary void in communication with the main central void and the second auxiliary void is positioned proximate the second side end of the main central void.

10. The track chain member of claim 9 wherein the main central void defines a main central void depth in a direction perpendicular to the ground engaging surface, the first auxiliary void defines a first auxiliary void depth in a direction perpendicular to the ground engaging surface, and the second auxiliary void defines a second auxiliary void depth in a direction perpendicular to the ground engaging surface, and the first and the second auxiliary void depths are greater than the main central void depth.

11. A track chain assembly comprising:

a plurality of interlocking track chain members wherein each track chain member defines a track chain traveling direction, a lateral direction perpendicular to the track chain traveling direction, and a vertical direction that is perpendicular to the track chain traveling direction and the lateral direction, and includes a shoe member defining a first lateral end, a second lateral end, and a ground engaging surface spanning from the first lateral end to the second lateral end;

a first rail member extending from the shoe member disposed proximate the first lateral end, and a second rail member extending from the shoe member disposed proximate the second lateral end spaced away from the first rail member;

a first rib and a second rib extending between the first rail member and the first lateral end of the shoe member, defining a first side recess therebetween;

a third rib and a fourth rib extending between the second rail member and the second lateral end of the shoe member, defining a second side recess therebetween;

wherein each track chain member further defines a main central void defined by the ground engaging surface of the shoe member, and a first side recess that is bound by a top boundary and a bottom boundary along the vertical direction, and that is separated from the main central void by a web.

12. The track chain assembly of claim 11 wherein the main central void defines a lateral length ranging from 800 mm to 1600 mm.

13. The track chain assembly of claim 12 wherein the main central void defines a width measured along the track chain traveling direction ranging from 238 mm to 258 mm.

14. The track chain assembly of claim 13 wherein the main central void is evenly spaced from the first lateral end and the second lateral end.

15. The track chain assembly of claim 14 wherein the main central void is positioned a distance from either the first lateral end or the second lateral end ranging from 500 mm to 1000 mm.

16. The track chain assembly of claim 11 wherein for each track chain member the shoe member further defines a first auxiliary void in communication with the main central void and the main central void defines a first side end, and a second side end, and the first auxiliary void is positioned proximate the first side end of the main central void.

17. The track chain assembly of claim 16 wherein for each track chain member the shoe member further defines a second auxiliary void in communication with the main central void and the second auxiliary void is positioned proximate the second side end of the main central void.

18. The track chain assembly of claim 17 wherein for each track chain member the main central void defines a main central void depth in a direction perpendicular to the ground engaging surface, the first auxiliary void defines a first auxiliary void depth in a direction perpendicular to the ground engaging surface, and the second auxiliary void defines a second auxiliary void depth in a direction perpendicular to the ground engaging surface, and the first and the second auxiliary void depths are greater than the main central void depth.

19. The track chain assembly of claim 18 wherein each track chain member includes a first projection disposed at least partially above the first auxiliary void and a second projection disposed at least partially above the second auxiliary void.

20. The track chain assembly of claim 18 wherein the depth of the first auxiliary void, the depth of the second auxiliary void and the depth of the main central void includes an undulating surface.

* * * * *